2 Sheets—Sheet 1.

J. W. TUFTS.
Manufacture of Articles Produced by Electro-Deposition.

No. 202,969. Patented April 30, 1878.

Witnesses,
W. J. Cambridge
J. E. Cambridge

Inventor,
James W. Tufts,
Per Teschemacher & Stearns,
Attorneys.

J. W. TUFTS.
Manufacture of Articles Produced by Electro-Deposition.

No. 202,969. Patented April 30, 1878.

Witnesses,
W. J. Cambridge
J. E. Cambridge

Inventor,
James W. Tufts,
Per Teschemacher & Stearns
Attorneys.

UNITED STATES PATENT OFFICE.

JAMES W. TUFTS, OF MEDFORD, MASSACHUSETTS.

IMPROVEMENT IN THE MANUFACTURE OF ARTICLES PRODUCED BY ELECTRO-DEPOSITION.

Specification forming part of Letters Patent No. 202,969, dated April 30, 1878; application filed January 30, 1878.

*To all whom it may concern:*

Be it known that I, JAMES W. TUFTS, of Medford, in the county of Middlesex and State of Massachusetts, have invented certain Improvements in the Manufacture of Articles Produced by the Electro-Deposition of Metal, of which the following is a full, clear, and exact description, reference being had to the accompanying drawings, making part of this specification, in which—

Figure 4:
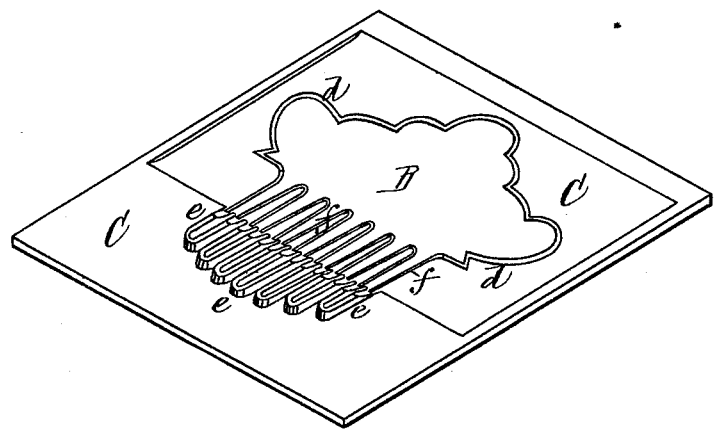
Figure 5:
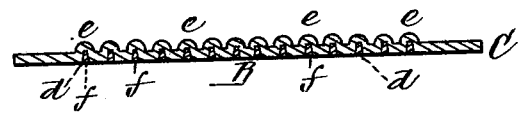
Figure 6:
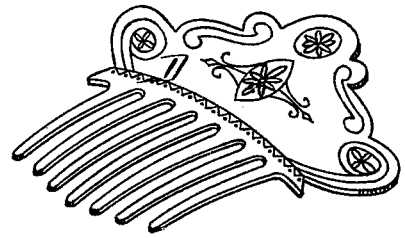
Figure 1:
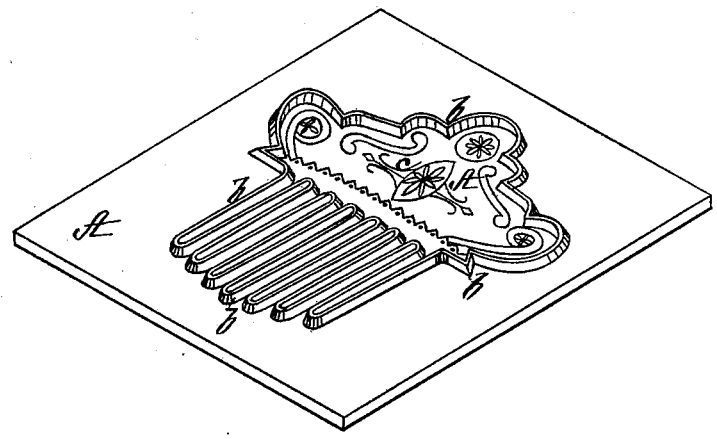
Figure 2:
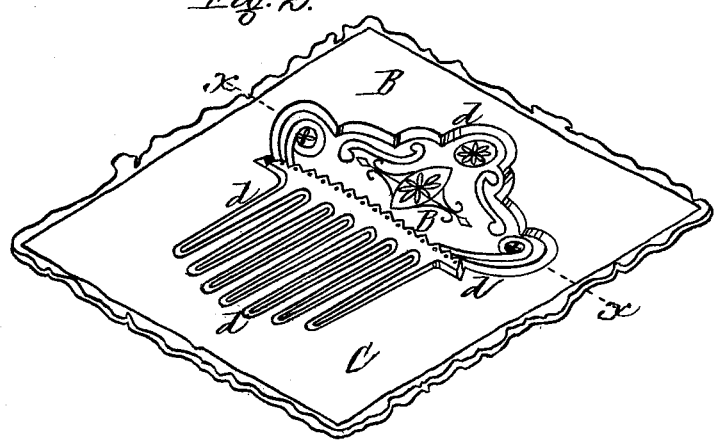
Figure 3:
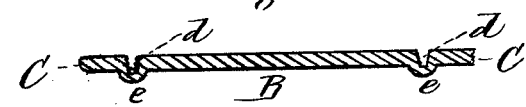

Figure 1 is a perspective view of a mold for making electrotypes in accordance with my invention. Fig. 2 is a perspective view of an electrotype produced therefrom. Fig. 3 is a section on the line $x\ x$ of Fig. 2. Fig. 4 is a perspective view of the rear side of the electrotype shown in Fig. 2, illustrating the manner in which the article is liberated in a finished state from the surrounding waste metal. Fig. 5 is a section (enlarged) illustrating the manner in which the whole or a portion of the groove or grooves of the electrotype is temporarily filled with soft metal or other suitable substance, to prevent the formation of a burr or rough edge in the operation of removing the article from the surrounding waste metal. Fig. 6 is a view of a comb made by the electrotype process in accordance with my invention.

Articles produced by the electrotype process have always a rough or ragged edge, caused by the unequal deposition or building up of the metal at the edge of the mold, and considerable time is required to file off this ragged edge in order to give the article the desired finish.

My invention has for its object to economize this time heretofore required to finish the edge of an electrotype, and thereby simplify and cheapen the manufacture of articles produced by the electrotype process; and consists in the employment of a mold provided with a projecting lip or ridge extending around the edge or outline of the figure of the article to be produced, and with a similar lip or lips extending around the edge of the figure of any open-work design to be formed therein, in order that the electrotype made from such mold may have a groove or grooves in its face corresponding to the lip or lips of the mold, which necessarily involves the formation of a corresponding ridge or ridges on the back of the electrotype, the ridge or ridges thus formed, and also, if desired, a portion of the remaining or plane surface of the back of the electrotype, being subsequently removed, by planing, grinding, or other mechanical means, to the bottom of the groove or grooves from the rear side, by which means the article contained within the boundary-line formed by the groove surrounding it is liberated from the contiguous waste metal, and may be removed therefrom in a finished state, the open-work portion, if any, being simultaneously produced in the same manner.

My invention also consists in filling the whole or a portion of the groove or grooves of the electropype, which are to be cut into from the back, with soft metal or other suitable substance, which serves to support the edges of the electrotype article during the process of liberating it from the surrounding waste metal, and thus prevent the liability of a burr or rough edge being produced by the action of the cutting-tool, the temporary filling being subsequently removed by melting or otherwise.

To enable others skilled in the art to understand and use my invention, I will proceed to describe the manner in which I have carried it out.

In the said drawings, A, Fig. 1, represents a mold for making a comb by the electrotype process. This mold, which may be formed of wax or other suitable material in any well-known manner, is provided on its face with a projecting lip or ridge, $b$, which extends entirely around, and forms the outline or boundary of the figure of the article to be produced by the electrotype process.

The mold A, which may be provided or not with an ornamental design, $c$, is then suspended in the decomposing-trough containing the necessary solution, and connected with the battery in the usual manner, and allowed to remain until a sufficient thickness of metal has been deposited thereon. The electrotype B, Fig. 2, thus formed, when detached from the mold A, will be provided with a groove, $d$, (the exact counterpart of the lip $b$) extending entirely around the contour of the comb, a corresponding ridge, $e$, being necessarily formed on the back of the electrotype, as seen in Figs. 3 and 4. This ridge e, and, if desired, a portion of more or less thickness of the remaining or plane surface of the back of the electrotype, is then removed by planing, grinding, or other mechanical means, which cuts into the bottom of the groove d along its entire length from the rear side of the electrotype, as seen in Fig. 4, thus liberating the comb from the surrounding waste metal C in a finished state, and the labor heretofore required to file or finish up the edges of the electrotype is thus entirely saved; and if a portion of the plane surface of the back of the electrotype is acted upon by the cutting-tool in the operation of cutting into the groove, as above described, the surface will be left smooth and even, instead of in a rough or granular state, as would otherwise be the case.

Where open-work is to be produced, the edges of the design in the mold are provided with lips similar to that b, so that the portions of the electrotype to be removed are each surrounded by a groove similar to d, which, when cut into from the back, as above described, liberates the inclosed piece, and thus produces the open-work design at the same time that the electrotype article itself is liberated from the surrounding waste metal.

In practice I prefer to fill the groove d, or a portion thereof, with soft metal f, Figs. 4 and 5, or other suitable substance, such as rosin or plaster, which serves to support the contiguous edges of the article during the operation of removing it from the surrounding waste metal C; and by this means all liability of a burr or rough edge being produced by the action of the cutting-tool is entirely avoided, any portion of this filling f which may adhere to the edges of the article being subsequently removed by melting or otherwise. This filling of the grooves may, however, be dispensed with, if desired.

After the comb D has been removed from the waste, it is shaped by suitable dies, which give it the form seen in Fig. 6; and it may then, if desired, be electroplated with some other metal to render it more ornamental.

From the foregoing it will be seen that an infinite variety of articles of various forms may be economically produced in a finished state by the method above described; and it is evident that the molds may be provided, if desired, with ornamental designs, either sunken or in relief.

What I claim as my invention, and desire to secure by Letters Patent, is—

1. As an improvement in the manufacture of articles by the electrotype process, the deposition of metal upon a mold provided on its face with a projecting lip or ridge, b, extending around the edge or outline of the figure of the article to be produced, and with a similar lip or lips around the edge of the figure of any open-work design to be formed therein, substantially as and for the purpose set forth.

2. The method herein described of making a finished electrotype, consisting in the production of one or more grooves, d, in its face, and one or more corresponding ridges, e, in its back, by means of a suitable mold, and liberating from the surrounding waste metal the article in a finished state, and producing any open-work design to be formed therein by removing the ridge or ridges e from the back of the electrotype and cutting into the bottom of the groove or grooves d in its face, substantially as set forth.

3. The method of supporting the edge or edges of the article and preventing the formation of a burr thereon while being liberated from the surrounding waste metal, by filling the whole or a portion of the groove or grooves d of the electrotype with soft metal or other suitable substance, substantially as described.

Witness my hand this 28th day of January, A. D. 1878.

JAMES W. TUFTS.

In presence of—
P. E. TESCHEMACHER,
N. W. STEARNS.